March 3, 1964  D. TOSCHKOFF  3,123,094
DUAL DIAPHRAGM PRESSURE RESPONSIVE FLOW CONTROL VALVE
Filed Feb. 5, 1962
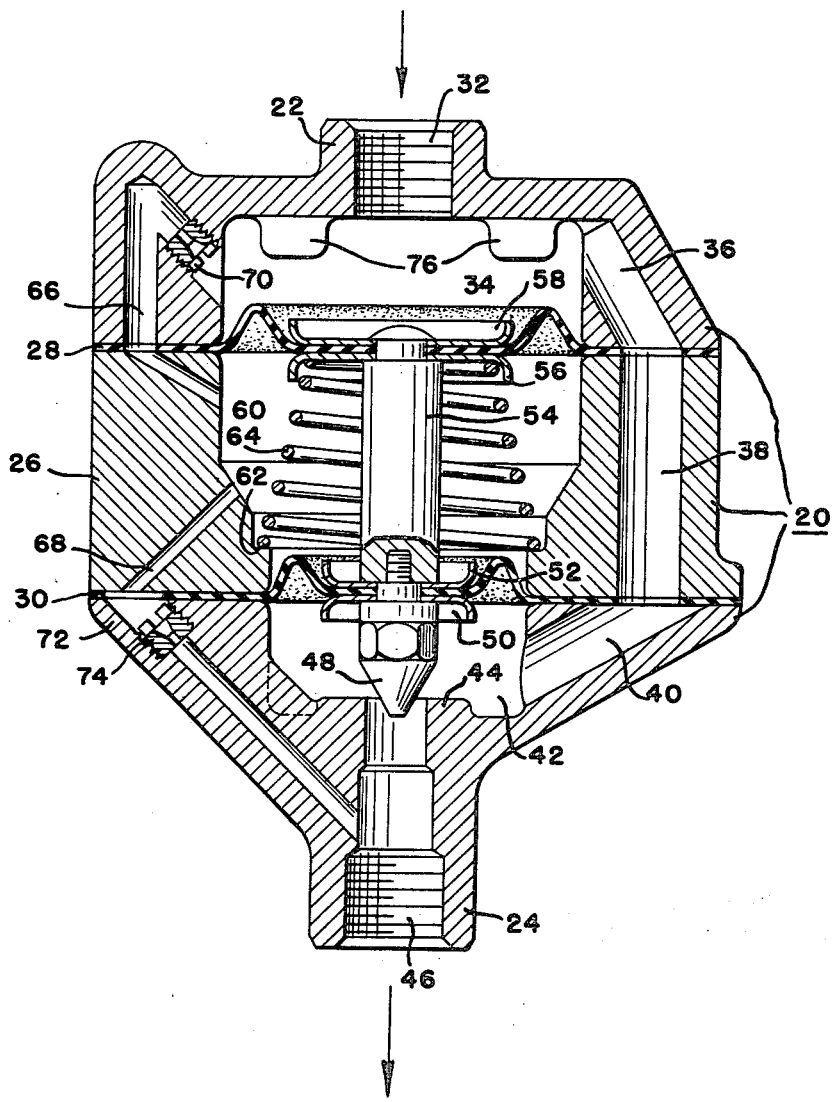
INVENTOR.
Dimitar Toschkoff
BY
His Attorney 3,123,094
DUAL DIAPHRAGM PRESSURE RESPONSIVE FLOW CONTROL VALVE
Dimitar Toschkoff, Flint, Mich., assignor to General Motors Corporation, Detroit, Mich., a corporation of Delaware
Filed Feb. 5, 1962, Ser. No. 171,224
6 Claims. (Cl. 137—505.13)

This invention pertains to fluid controls and more particularly to means for providing a constant flow over a wide range of conditions regardless of changes in temperature and pressure.

Various arrangements have been made to provide a constant flow so that the amount of fluid delivered is proportional to the time allowed for delivery. However, some such arrangements maintain such a constant flow only over a limited range and some are affected by variations in temperature. Some are susceptible to hunting.

It is an object of this invention to provide a simple inexpensive flow control arrangement which will not hunt for providing constant flow over a wide range of temperatures and pressures.

This and other objects are attained in the form shown in the drawings in which two parallel diaphragms, one having twice the effective area of the other, are directly connected to the outlet valve in a valve body. An intermediate pressure is maintained between the two diaphragms through a restricted passage from the inlet to the space in between the diaphragms and a second restricted passage from the space in between the diaphragms to the outlet. The out-turned faces of the diaphragms are subject to the inlet pressure. A spring located in between the diaphragms opposes the effect of the inlet pressure on the diaphragm of the greater effective area and varies the position of the conical valve so that a substantially constant flow is provided through the outlet regardless of pressure and temperature variations.

Further objects and advantages of the present invention will be apparent from the following description, reference being had to the accompanying drawing wherein a preferred embodiment of the present invention is clearly shown.

In the drawings:

The figure is a sectional view through a flow control embodying one form of my invention.

Referring now to the drawing, the flow control includes a valve body 20 which is divided into three parts. This body 20 includes an upper inlet portion 22, a lower outlet portion 24, and a middle portion 26. Between the upper inlet portion 22 and the middle portion 26 is a large diaphragm 28 and between the middle portion 26 and the lower outlet portion 24 is a smaller diaphragm 30. These diaphragms may be made of any suitable resilient material, such as an elastomer which may be synthetic rubber. The diaphragms 28 and 30 may also be provided with suitable fabric or fibrous reinforcements. These diaphragms 28 and 30 are clamped between the upper, middle and lower sections with the sufficient force to provide an effective seal.

The upper portion 22 is provided with an inlet 32 leading directly to an inlet chamber 34 provided between the top wall of the upper portion 22 and the diaphragm 28. A flow passage 36 extends from the chamber 34 through an aligned aperture in the diaphragm 28 and the passage 38 in the portion 26 and the passage 40 in the lower portion 24 to a valve chamber 42 located in the portion 24. This valve chammber 42 is located between the bottom of the member 24 and the lower face of the diaphragm 30 which is provided with an aligned aperture providing connection between the passages 38 and 40. The valve chamber 42 is provided with a valve seat 44 within which is a threaded outlet passage 46 extending downwardly. A valve 48 provided with a conically shaped lower surface cooperates wtih the valve seat 44.

The top of the valve 48 is screwed through a pair of diaphragm protector disks 50 and 52 to the valve stem 54 extending between the diaphragms 28 and 30. The diaphragm protector disks 50 and 52 are located on the opposite faces of the diaphragm 30 between the valve 48 and the valve stem 54. The top of the valve stem 54 is connected to the diaphragm protector disks 56 and 58 located on opposite sides of the central portion of the diaphragm 28. The diaphragm protector disks 56 and 58 may be fastened to the valve stem 54 by riveting. In the control shown, the lower diaphragm protector disks, for example, have an effective diameter of .596 inch and the upper protector disks 56 and 58 have an effective diameter of .88 inch. The inside diameter of the inlet chamber 34, for example, is 1.38 inches to give the diaphragm 28 an effective area of 1.0 square inch. The valve chamber 42, for example, has an inner diameter of 1.0 inch providing an effective area of the lower diaphragm 30 of one-half a square inch. The middle portion 26 of the valve body 20 is provided with a chamber 60 having an upper portion with a diameter equal to the diameter of the chamber 34 and a lower portion with a diameter equal to the diameter of the valve chamber 42. Above the lower diaphragm 30 there is provided a shoulder 62 which supports the lower end of a coil spring 64, the upper end of which is held by the diaphragm protector disk 56 which also serves as a spring retainer. The top wall of the upper portion 22 is provided with a plurality of downwardly extending projections 76 extending into the path of the upward movement of the rim of the protector disk 58 to limit the opening movement of the valve 48 and the deflection of the diaphragms 28 and 30.

In another portion of the wall of the valve body 20, there is provided a passage 66 leading from the inlet chamber 34 through an aperture in the diaphragm 28 to the intermediate chamber 60. Also, in another portion of the wall of the valve body 26 is a passage 68 leading from the intermediate chamber 60 to the outlet passage 46 through an aperture in the lower diaphragm 30. The entrance to the passage 66 is provided with a threaded restrictor 70 which threads into the entrance of the passageway and is provided with a screwdriver slot and a restricted passage. This restrictor 70 restricts the flow of fluid from the chamber 34 into the chamber 60. The portion of the passage 68 in the lower valve body portion 24 is provided with an enlargement 72 containing a threaded restrictor 74 provided with a screwdriver slot and a restricted passage which restricts the flow from the intermediate chamber 60 through the passage 68 to the outlet 46. These restrictors 70 and 74 are made removable so that they can be replaced with other restrictors of diffeernt sizes. If the restrictors 70 and 74 are of substantially equal size, then the pressure in the intermediate chamber 60 could be expected to be intermediate the pressure at the inlet 32 and the pressure at the outlet 46. If the restrictor 70 is of greater capacity than the restrictor 74, then the pressure within the chamber 60 would be increased while, if the reverse were provided, the pressure within the intermediate chamber 60 would be reduced relative to the inlet pressure 32.

The valve 48 is provided with a conical shape. The angle of the cone of the valve 48 depends upon the rate of the spring 64. If the rate of the spring 64 is high, the cone will be more blunt, whereas, if the spring rate is low, the angle of the cone will be more pointy. By properly proportioning the angle of the cone to the rate of the spring 64, the pressure in the chamber 34 acting upon the net effective area of the upper diaphragm 28 will deflect both diaphragms 28 and 30 and the valve 48 such a distance that the correct amount of throttling at the valve seat 44 will be provided by the valve 48 to maintain a constant flow from the outlet 46. The diaphragms 28 and 30 are provided with one or more annular corrugations surrounding the diaphragm protectors to provide sufficient flexibility for guiding the valve 48 and the valve stem 54 in their movement in alignment with the valve seat 44. The valve is not sensitive to temperature changes. It is, however, capable of providing a constant flow under a wide range of pressures. The lower diaphragm 30 provides a convenient seal between the valve stem 54 and the lower portion 24 of the valve body. The arrangement of the intermediate chamber in conjunction with the restrictors 70 and 74 provides a time delay action for the diaphragms and the valve to damp out hunting. Since the upper diaphragm 28 has twice the effective area of the lower diaphragm 30, an equal downward deflection of both diaphragms will decrease the volume of the intermediate chamber 60 while an equal upward movement of both diaphragms 28 and 30 will increase the volume of the intermediate chamber 60. The fluid within the intermediate chamber 60 will oppose the decrease or increase in the volume of the intermediate chamber 60 since the restrictors 70 and 74 will restrict the ingress and exit of fluid from the intermediate chamber 60 during such decrease or increase in its volume to provide the desired time delay action and the desired prevention of hunting.

While the embodiment of the present invention, as herein disclosed, constitutes a preferred form, it is to be understood that other forms might be adopted.

What is claimed is as follows:

1. A fluid control including a valve body provided with a fluid inlet and a fluid outlet and a first passage extending from said inlet to said outlet, a first diaphragm means within said valve body having one face exposed to the pressure at said inlet, a second diaphragm means in said valve body having one face exposed to the pressure at said inlet, valve means within said valve body for controlling the flow of fluid through said outlet, operating means for said valve means operably connected to said first and second diaphragm means, restricted second passage means extending in parallel circuit relative to said first passage through the valve body from said inlet to said outlet, said first and second diaphragm means having different effective areas and each having their second faces exposed to the fluid pressure in an intermediate portion of said second passage means.

2. A fluid control including a valve body provided with a fluid inlet and a fluid outlet and a first passage extending from said inlet to said outlet, a first diaphragm means within said valve body having one face exposed to the pressure at said inlet, a second diaphragm means in said valve body having one face exposed to the pressure at said inlet, valve means within said valve body for controlling the flow of fluid through said outlet, operating means for said valve means operably connected to said first and second diaphragm means, restricted second passage means extending in parallel circuit relative to said first passage through the valve body from said inlet to said outlet, said first and second diaphragm means each having their second faces exposed to the fluid pressure in an intermediate portion of said passage means, said diaphragm means being connected in opposed of relationship to each other, one of said diaphragm means having a greater effective area than the other, and spring means for counteracting the differential in force upon the diaphragm means.

3. A fluid control including a valve body provided with a fluid inlet and a fluid outlet and a first passage extending from said inlet to said outlet, a first diaphragm means within said valve body having one face exposed to the pressure at said inlet, a second diaphragm means in said valve body having one face exposed to the pressure at said inlet, valve means within said valve body for controlling the flow of fluid through said outlet, operating means for said valve means operably connected to said first and second diaphragm means, restricted second passage means extending in parallel circuit relative to said first passage through the valve body from said inlet to said outlet, said first and second diaphragm means each having their second faces exposed to the fluid pressure in an intermediate portion of said passage means, said diaphragm means being connected in opposed relationship to each other, one of said diaphragm means having a greater effective area than the other, spring means having a predetermined rate for counteracting the differential or force upon the diaphragm means and controlling the positioning of the valve means in accordance with the inlet pressure, said valve means comprising means providing an outlet opening having an area proportional to the movement of said diaphragm means.

4. A fluid control including a valve body provided with a fluid inlet and a fluid outlet and a valve seat located between said fluid inlet and outlet, two spaced substantially parallel diaphragm means having their peripheries sealed to the valve body coaxially aligned with each other and with said valve seat and enclosing an intermediate chamber between them, valve means coaxially aligned with and cooperating with said valve seat and fastened to and coaxially aligned with both of said diaphragm means, a first passage means extending from said inlet through said valve body around and separated from said intermediate chamber to said valve seat and having portions extending to the faces of said diaphragm means facing away from said intermediate chamber, one of said diaphragm means having a larger effective area than the other, a restricted second passage means extending in parallel circuit relative to said first passage from said fluid inlet to said intermediate chamber and from said intermediate chamber to said fluid outlet, and spring means located in said intermediate chamber extending between the valve body and one of said diaphragm means for controlling said valve means.

5. A fluid control including a valve body provided with a fluid inlet and a fluid outlet and a valve seat located between said fluid inlet and outlet, two spaced substantially parallel diaphragm means having their peripheries sealed to the valve body coaxially aligned with each other and with said valve seat and enclosing an intermediate chamber between them, valve means coaxially aligned with and cooperating with said valve seat and fastened to and coaxially aligned with each of said spaced diaphragm means, said valve body being provided with a first passage means extending from said inlet around and separated from said intermediate chamber to said valve seat and having portions extending to the faces of said spaced diaphragm means facing away from said intermediate chamber, one of said diaphragm means having a larger effective area than the other, and a restricted second passage means extending from said intermediate chamber to said fluid outlet.

6. A fluid control including a valve body provided with a fluid inlet and a fluid outlet and a valve seat located between said fluid inlet and outlet, two spaced substantially parallel diaphragm means having their peripheries sealed to the valve body coaxially aligned with each other and with said valve seat and enclosing an intermediate chamber between them, valve means coaxially aligned with and cooperating with said valve seat and fastened to and coaxially aligned with each of said diaphragm means, a first passage means extending from said inlet through said valve body around and separated from said intermediate chamber to said valve seat and having portions extending to the faces of said diaphragm means facing away from said intermediate chamber, one of said diaphragm means having a larger effective area than the other, a restricted second passage means extending from said fluid outlet to said intermediate chamber, and spring means extending between said valve body and one of said diaphragm means for controlling said valve means.

References Cited in the file of this patent

UNITED STATES PATENTS

| | | |
|---|---|---|
| 596,601 | Knox | Jan. 4, 1898 |
| 2,807,144 | St. Clair | Sept. 24, 1957 |
| 2,938,538 | Allen | May 31, 1960 |

FOREIGN PATENTS

| | | |
|---|---|---|
| 896,214 | France | Apr. 24, 1944 |